Figure 1:
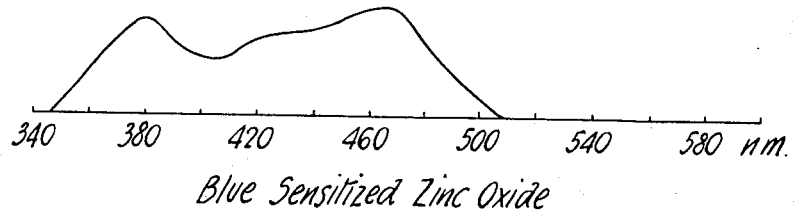

United States Patent
Hercock et al.

[11] 3,709,685
[45] Jan. 9, 1973

[54] PHOTOCONDUCTIVE ZINC OXIDE SENSITIZED BY SUBSTITUTED THIAZOLIDENE DYES

[75] Inventors: Robert James Hercock; Simon Lindsay Scrutton, both of Ilford, England

[73] Assignee: Ilford Limited, Ilford, Essex, England

[22] Filed: Feb. 18, 1971

[21] Appl. No.: 116,314

[30] Foreign Application Priority Data

Feb. 19, 1970    Great Britain..................8,093/70

[52] U.S. Cl.............................96/1.7, 260/294.8 D
[51] Int. Cl............................................G03g 5/08
[58] Field of Search............96/1.7, 139; 260/294.8 D

[56] References Cited

UNITED STATES PATENTS

| | | | |
|---|---|---|---|
| 2,519,001 | 8/1950 | Sprague | 96/139 X |
| 2,656,353 | 10/1953 | Jeffreys et al. | 96/139 X |
| 3,125,447 | 3/1964 | Stewart | 96/1.7 |

Primary Examiner—Donald Levy
Assistant Examiner—Roland E. Martin, Jr.
Attorney—Cushman, Darby & Cushman

[57] ABSTRACT

This application describes electrophotographic material which comprises a photoconductive layer which has been sensitized to light of the blue region of the spectrum by the presence therein of an optical sensitizing dye of the general formula:

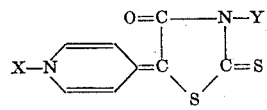

or of the formula:

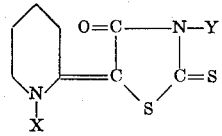

wherein at least one of X and Y is an acidic group $-(CH_2)_nCOOM$ or $-(CH_2)_nSO_3M$ wherein in each group M is a cation and $n$ is an integer from 1 to 4, the other of X and Y when not a said acidic group is a hydrogen atom or an alkyl group containing from one to four carbon atoms or an aryl group.

4 Claims, 2 Drawing Figures

Wedge Spectrograms

Blue Sensitized Zinc Oxide

Unsensitized Zinc Oxide

PHOTOCONDUCTIVE ZINC OXIDE SENSITIZED BY SUBSTITUTED THIAZOLIDENE DYES

This invention relates to electrophotographic material.

Electrophotographic material generally comprises a photoconductive layer coated on a support base which has been rendered at least partially electroconductive. Alternatively it comprises a photoconductive layer on an electroconductive layer which is in its turn coated on a support base. One of the most common photoconductive layers comprises zinc oxide particles in an insulating binder. Specially prepared zinc oxide which is photoconductive has to be employed and such zinc oxide is usually ultra violet light sensitive, the sensitivity extending only a short distance into the visible light region of the spectrum. Color electrophotographic material using zinc oxide photoconductive layers can be prepared and in this case the surface of the electrophotographic material usually comprises areas which have been selectively sensitized to the blue, green and red regions of the visible spectrum. There are a comparatively large number of good sensitizing dyes which are capable of sensitizing zinc oxide to the red and the green regions of the spectrum but there are only a few dyes which appear to be capable of sensitizing zinc oxide to the blue region of the spectrum.

It is the object of the present invention to provide electrophotographic material, the photoconductive layer of which has been sensitized to the blue region of the spectrum.

According to the present invention there is provided electrophotographic material which comprises a photoconductive layer which has been sensitized to light of the blue region of the spectrum by the presence therein of an optical sensitizing dye of the general formula I:

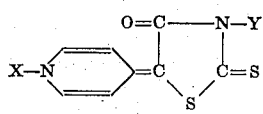

or of the formula II:

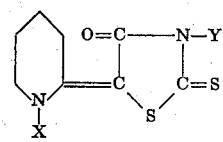

wherein at least one of X and Y is an acidic group — $(CH_2)_nCOOM$ or $-(CH_2)_nSO_3M$ wherein in each group M is a cation and $n$ is an integer from 1 to 4, the other of X and Y when not a said acidic group is a hydrogen atom or an alkyl group containing from one to four carbon atoms or an aryl group.

M may be a hydrogen atom or an alkali metal such as sodium or potassium or an alkaline earth such as calcium or ammonium or substituted ammonium.

The whole of the surface of the electrophotographic material may be sensitive to blue light by the presence therein of one of the dyes of the above formulas or selected regions only of the surface may be sensitive. In the latter case the surface of the photoconductive layer may comprise a mosaic of areas each of which has been selectively sensitized to one of the regions of the spectrum, blue, green or red.

The photoconductive layer is preferably photoconductive zinc oxide in a binder but it may be an organic photoconductor, for example polyvinyl carbazole.

The electrophotographic material of the present invention may be prepared by coating a solution of one of the dyes of the above formulas directly on to the unsensitized photoconductive layer or particles of the photoconductive material, preferably zinc oxide, may have been sensitized by placing them in a solution of the above sensitizing dyes and drying and these sensitized particles may then be coated onto the electropotographic mater.

Preferably the electrophotographic material of the present invention is prepared by adding a solution of the dye to the coating mixture which comprises the photoconductive material, insulating binder, if present, and diluent liquid, before the coating mixture is coated onto the support base. When the photoconductive material is zinc oxide the solution of the dye may be added to the zinc oxide before it is mixed with an insulating binder, after it has been mixed with the binder but before dispersion, or it may be added to the coating mixture containing the zinc oxide after dispersion.

Therefore according to another feature of the present invention there is provided a liquid sensitizer for the sensitizing of electrophotographic material which comprises an insulating liquid having suspended therein charged zinc oxide particles, said zinc oxide particles having been dyed with one of the dyes of the above formulas I or II.

Liquid sensitizers for the sensitizing of electrophotographic material are described in Ser. No. 94,201 filed Dec. 1, 1970.

The following example will serve to illustrate the invention.

EXAMPLE

The following coating mixture was prepared:

| | |
|---|---|
| Fotofax zinc oxide (ex Imperial Smelting Co.) | 30 g. |
| E87–09 resin (ex Cray Valley Products, St. Mary Cray, Kent, England). | 4.2g. |
| Toluene | 20 ml. |

Figure 2:
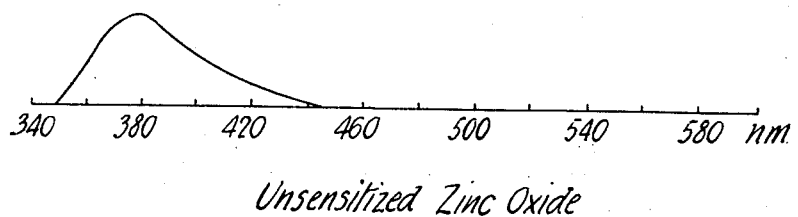

This coating mixture was ball-milled for 5 hours and then diluted with 15 ml toluene. 0.01 g of the dye 5-(1:4 dihydro-1-ethyl-4-pyridylidene)-4-oxo-2-thio-3-thiazolidene acetic acid was dissolved in 10 ml methanol and was added with stirring to the diluted coating mixture in a Silverson stirrer. When the dye had been thoroughly dispersed in the coating mixture, the coating mixture was coated on to an electroconductive paper base. A similar photoconductive coating was prepared and coated on to an electroconductive paper base except that the above mentioned pyridylidene dye was not added. A wedge spectrogram of each material was then prepared. These spectrograms are shown in the accompanying drawing wherein FIG. 1 shows the wedge spectrogram of the dye or blue sensitized zinc oxide material while FIG. 2 shows the spectrogram for the unsensitized zinc oxide material. The unsensitized electrophotographic material is light-sensitive in the ultraviolet region of the spectrum but its sensitivity extends just into the blue region of the spectrum, the blue region commencing at 420 mm. On the other hand the blue-sensitized material is also sensitive in the ultraviolet region of the spectrum but the sensitivity has in this case been extended to 500 nm. However the material has not been made sensitive to the green region of the spectrum, the green region commencing at 510 nm.

We claim as our invention:

1. Electrophotographic material which comprises a photoconductive layer containing zinc oxide as the photoconductive substance and which has been sensitized to light of the blue region of the spectrum by the presence therein of an optical sensitizing dye of the general formula:

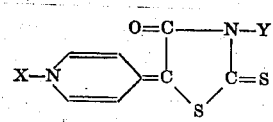

or of the formula:

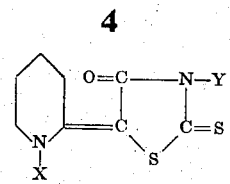

wherein at least one of X and Y is an acidic group —$(CH_2)_nCOOM$ or —$(CH_2)_nSO_3M$ wherein in each group M is a cation and $n$ is an integer from 1 to 4, the other of X and Y when not a said acidic group is a hydrogen atom or an alkyl group containing from one to four carbon atoms.

2. Electrophotographic material according to claim 1 wherein the photoconductive layer comprises zinc oxide in an insulating binder.

3. Electrophotographic material according to claim 1 which comprises a photoconductive layer which has been sensitized to light of the blue region of the spectrum by the presence therein of 5-(1:4 dihydro-1-ethyl-4-pyridylidene) -4-oxo-2-thio-3-thiazolidene acetic acid.

4. Electrophotographic material according to claim 3 wherein the photoconductive layer comprises zinc oxide in an insulating binder.

* * * * *